(12) United States Patent　　(10) Patent No.:　　US 12,661,979 B2

Hornback et al.　　(45) Date of Patent:　　Jun. 23, 2026

(54) TANK MOUNT SYSTEM

(71) Applicant: Faurecia Emissions Control Technologies, USA, LLC, Columbus, IN (US)

(72) Inventors: Jerome Hornback, Indianapolis, IN (US); Jeff Prairie, Franklin, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 482 days.

(21) Appl. No.: 18/140,024

(22) Filed: Apr. 27, 2023

(65) Prior Publication Data

US 2024/0359554 A1　　Oct. 31, 2024

(51) Int. Cl.
B60K 15/07　　(2006.01)
B60K 15/03　　(2006.01)
F17C 13/08　　(2006.01)

(52) U.S. Cl.
CPC ........ B60K 15/07 (2013.01); B60K 15/03006 (2013.01); F17C 13/08 (2013.01)

(58) Field of Classification Search
CPC .............. B60K 15/07; B60K 15/03006; B60K 2015/03118
See application file for complete search history.

(56) References Cited

U.S. PATENT DOCUMENTS

| | | | |
|---|---|---|---|
| 7,562,788 B2 * | 7/2009 | Watanabe .............. | B60K 15/07 |
| | | | 248/671 |
| 11,512,815 B2 | 11/2022 | Yeggy | |
| 2017/0057348 A1 * | 3/2017 | Arold ..................... | F17C 13/084 |
| 2023/0003342 A1 * | 1/2023 | Fujii ......................... | F17C 1/06 |
| 2024/0142055 A1 * | 5/2024 | Kjenner .................. | F17C 1/007 |

FOREIGN PATENT DOCUMENTS

| | | | | | |
|---|---|---|---|---|---|
| CN | 204567277 U | * | 8/2015 | | |
| DE | 102007043947 A1 | | 3/2009 | | |
| WO | 2022094483 A1 | | 5/2022 | | |
| WO | WO-2023180005 A1 | * | 9/2023 | ............ | F17C 13/083 |

* cited by examiner

*Primary Examiner* — Minnah L Seoh
*Assistant Examiner* — Hosam Shabara
(74) *Attorney, Agent, or Firm* — Carlson, Gaskey & Olds, P.C.

(57)　　ABSTRACT

A tank mount system, according to an exemplary aspect of the present disclosure includes, among other things, a center support structure and a retention structure. The center support structure has a first side configured to support a first plurality of tanks and a second side configured to support a second plurality of tanks. The retention structure is attachable to each side of the center support structure to resiliently support the first and second pluralities of tanks.

20 Claims, 4 Drawing Sheets

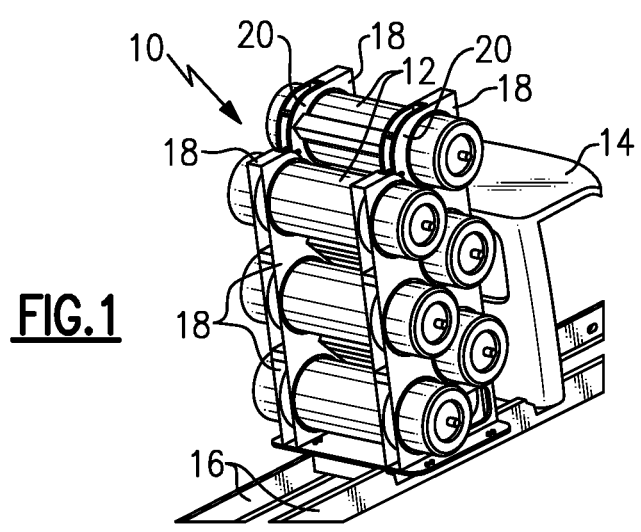
FIG.1
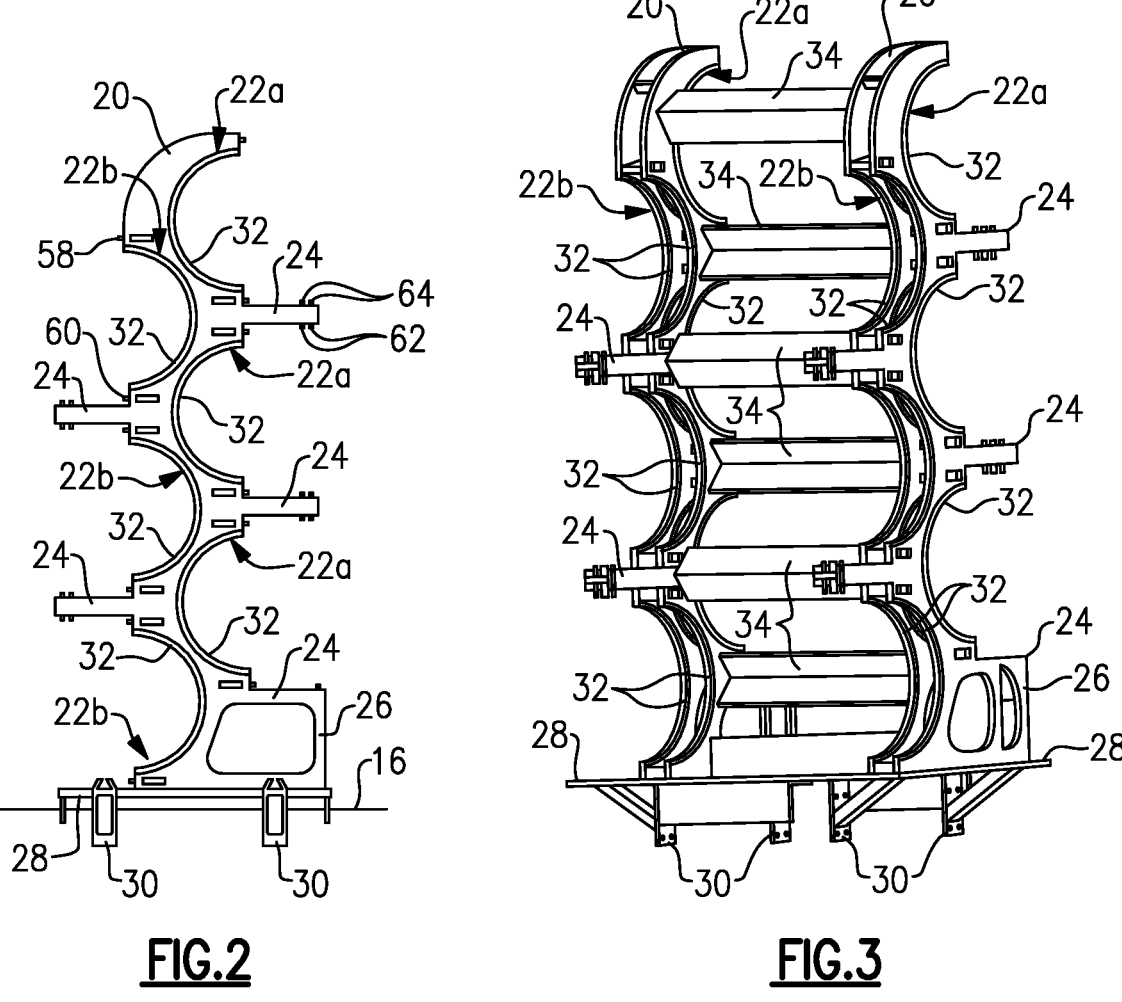
FIG.2　　　　　FIG.3

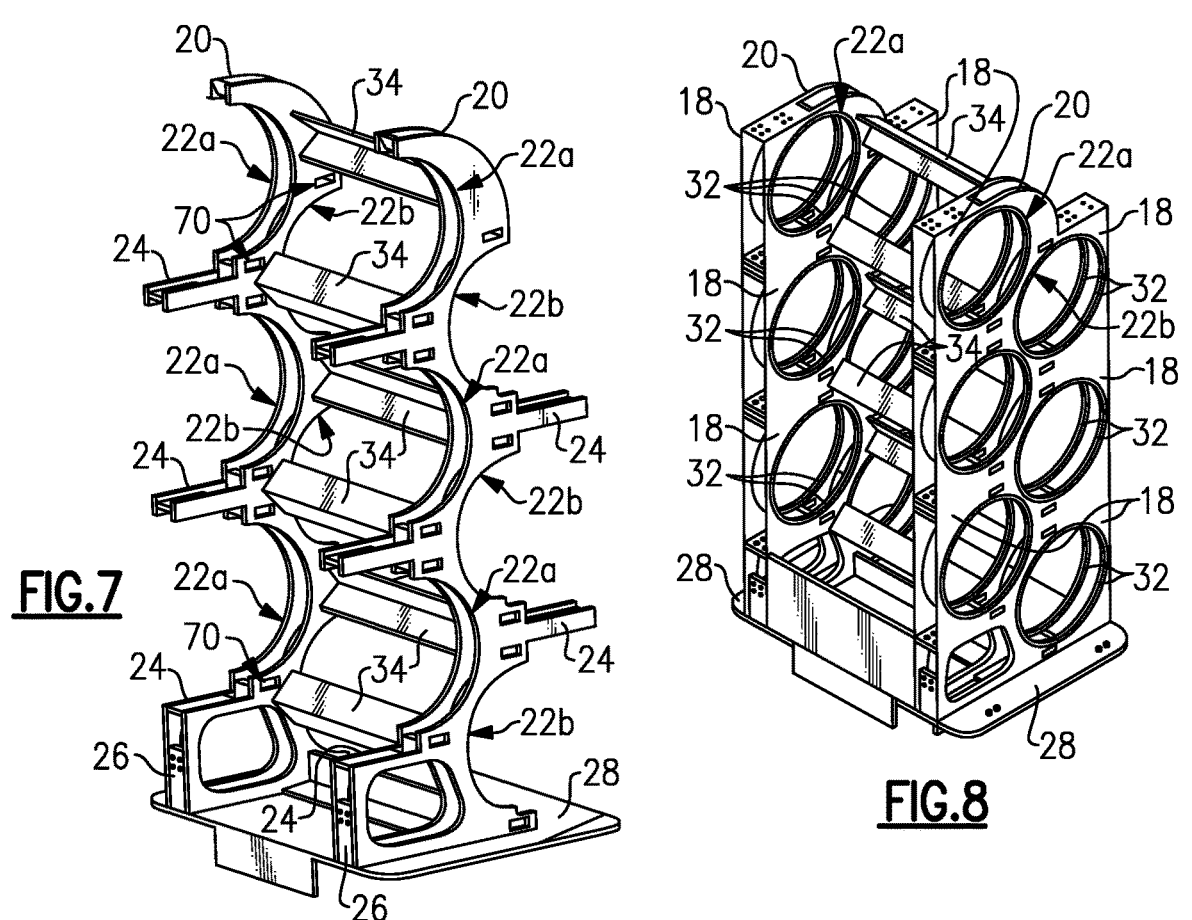
FIG.7
FIG.8
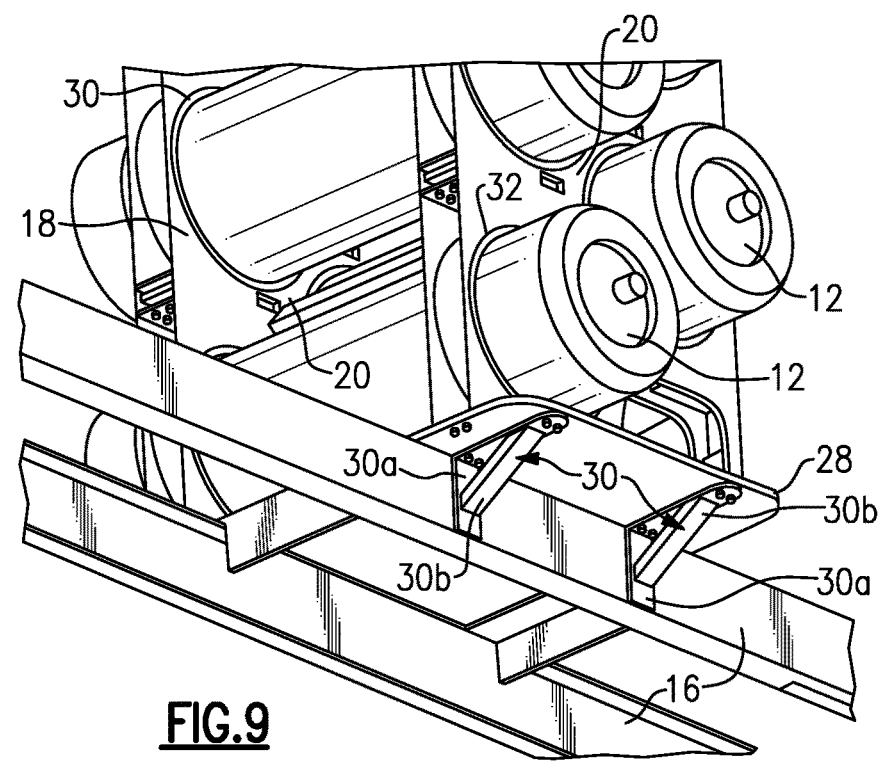
FIG.9

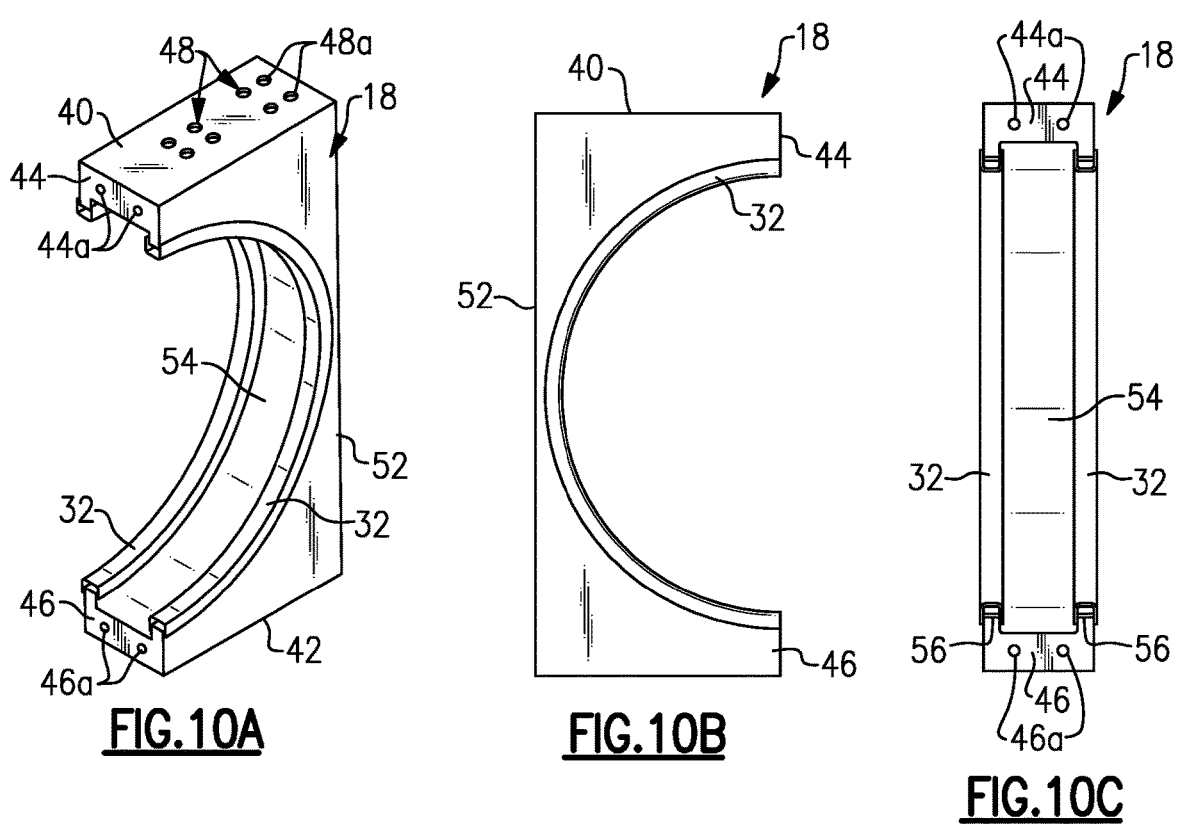
FIG.10A
FIG.10B
FIG.10C
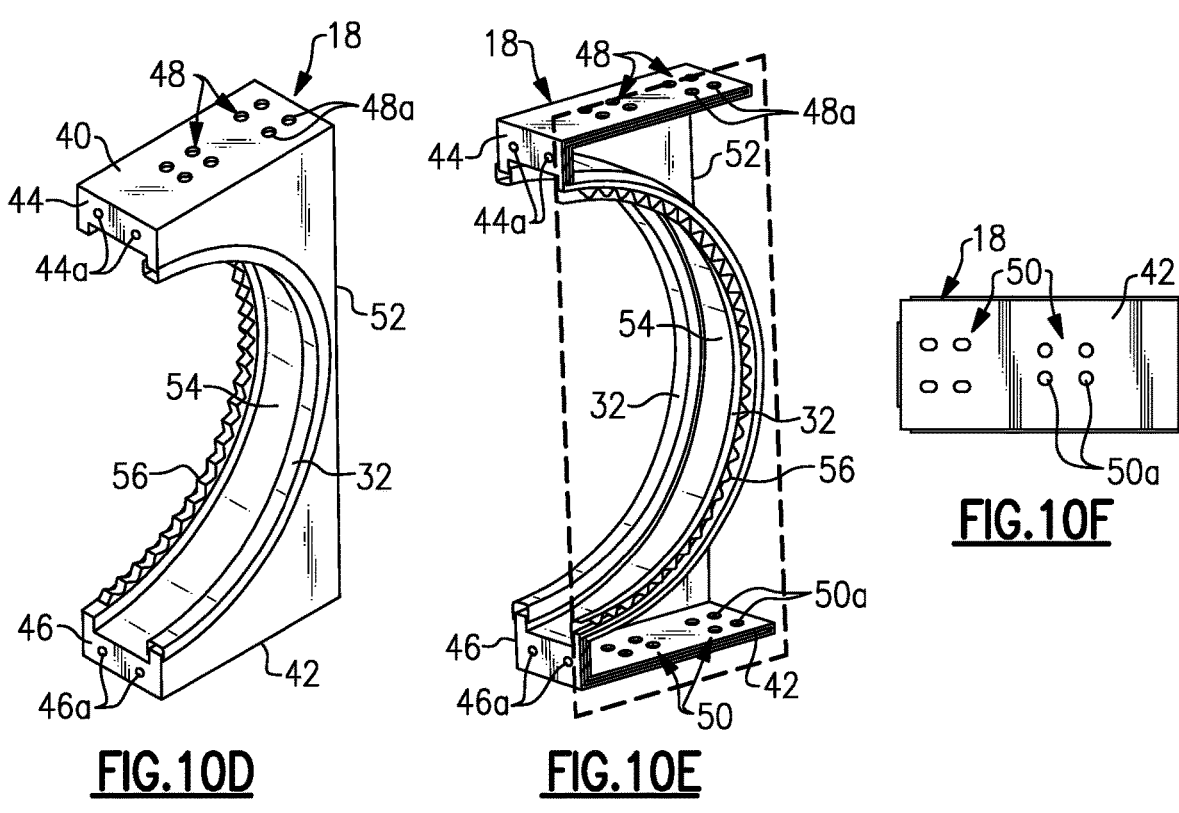
FIG.10D
FIG.10E
FIG.10F

TANK MOUNT SYSTEM

TECHNICAL FIELD

This disclosure relates generally to a tank mount system, and relates more specifically to a tank mount system including a center support and resilient retention structure to mount a plurality of tanks to a vehicle.

BACKGROUND

Vehicles that are powered by hydrogen require fuel storage capability. Hydrogen may be stored as compressed gas contained in cylindrical tanks. In order to meet a desired operating range of the vehicle, multiple tanks must be installed to achieve the targeted capacity.

SUMMARY

A tank mount system according to an exemplary aspect of the present disclosure includes, among other things: a center support structure having a first side configured to support a first plurality of tanks and a second side configured to support a second plurality of tanks; and a retention structure attachable to each side of the center support structure to resiliently support the first and second pluralities of tanks.

In a further non-limiting embodiment of the foregoing tank mount system, the retention structure comprises at least one clamp.

In a further non-limiting embodiment of any of the foregoing tank mount systems, the first side comprises a first plurality of tank mount recesses for the first plurality of tanks and the second side comprises a second plurality of tank mount recesses for the second plurality of tanks, and wherein the at least one clamp comprises a clamp for each of the first plurality of recesses and for each of the second plurality of recesses.

In a further non-limiting embodiment of any of the foregoing tank mount systems, each of the first and the second plurality of tank mount recesses comprises an arcuate surface that surrounds one portion of an outer peripheral tank surface.

In a further non-limiting embodiment of any of the foregoing tank mount systems, each clamp includes a clamp arcuate surface that surrounds a remaining portion of the outer peripheral tank surface.

In a further non-limiting embodiment of any of the foregoing tank mount systems, each clamp includes at least one resilient member and at least one retention band that cooperates with a corresponding resilient member and retention band associated with each of the first and the second pluralities of tank mount recesses to resiliently support the first and second pluralities of tanks.

In a further non-limiting embodiment of any of the foregoing tank mount systems, the resilient member and the corresponding resilient member cooperate to provide a spring loaded washer that surrounds each tank.

In a further non-limiting embodiment of any of the foregoing tank mount systems, the retention band and the corresponding retention band cooperate to provide a protective ring that surrounds each tank.

In a further non-limiting embodiment of any of the foregoing tank mount systems, the protective ring is radially outward of the spring loaded washer and covers the spring loaded washer such that the protective ring positively contacts an outer tank surface.

A tank mount system, according to yet another exemplary aspect of the present disclosure includes, among other things: a first center support structure having opposing first and second sides that each comprise a plurality of tank mount recesses; a second center support structure having opposing first and second sides that each comprise a plurality of tank mount recesses, wherein the first center support structure is configured to support one end portion of a plurality of tanks and the second center support structure is configured to support an opposite end portion of the plurality of tanks; and a plurality of clamps, wherein each clamp is configured to attach to a respective one of the first and the second center support structures at each tank mount recess to resiliently support each tank.

In a further non-limiting embodiment of any of the foregoing tank mount systems, each tank mount recess comprises an arcuate surface that surrounds one portion of an outer peripheral tank surface, and wherein each clamp includes a clamp arcuate surface that surrounds a remaining portion of the outer peripheral tank surface.

In a further non-limiting embodiment of any of the foregoing tank mount systems, each clamp includes at least one resilient member and at least one retention band that cooperates with a corresponding resilient member and retention band associated with each tank mount recess to resiliently support a plurality of tanks.

In a further non-limiting embodiment of any of the foregoing tank mount systems, the system includes a base plate that supports the first and the second center support structures, and wherein the base plate is configured to attach to a vehicle chassis with a plurality of brackets.

A method according to still another exemplary aspect of the present disclosure includes, among other things: providing a center support structure having a first side configured to support a first plurality of tanks and a second side configured to support a second plurality of tanks; and resiliently clamping the first plurality of tanks to the first side with a first retention structure and resiliently clamping the second plurality of tanks to the second side with a second retention structure.

In a further non-limiting embodiment of the foregoing method, the first side comprises a first plurality of tank mount recesses for the first plurality of tanks and the second side comprises a second plurality of tank mount recesses for the second plurality of tanks, and the method further includes providing a clamp for each of the first and second pluralities of tank mount recesses that is attached to respective first and second sides of the center support structure, wherein each clamp includes at least one resilient member and at least one retention band that cooperates with a corresponding resilient member and retention band associated with each of the first and second pluralities of tank mount recesses to resiliently support the first and second pluralities of tanks.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 is a perspective view of a tank mount system as installed on a vehicle.

FIG. 2 is an end view of the tank mount system shown in FIG. 1 as mounted to a chassis and including retention bands.

FIG. 3 is a perspective view of the tank mount system of FIG. 2.

FIG. 7 is a perspective view of the tank mount system of FIG. 5.

FIG. 8 is a perspective view of the tank mount system with a plurality of clamps installed.

FIG. 9 is a bottom view of the tank mount system of FIG. 8 as mounted to the chassis.

FIG. 10A is a perspective view of a clamp.

FIG. 10B is a side view of the clamp of FIG. 10A.

FIG. 10C is an end view of the clamp of FIG. 10A

FIG. 10D is a view similar to FIG. 10A but showing an exposed spring washer portion and a retention band covering a spring washer portion.

FIG. 10E is a perspective section view of the clamp of FIG. 10A showing multiple mounting interfaces.

FIG. 10F is a bottom view of the clamp of FIG. 10A.

DETAILED DESCRIPTION

Figure 4:
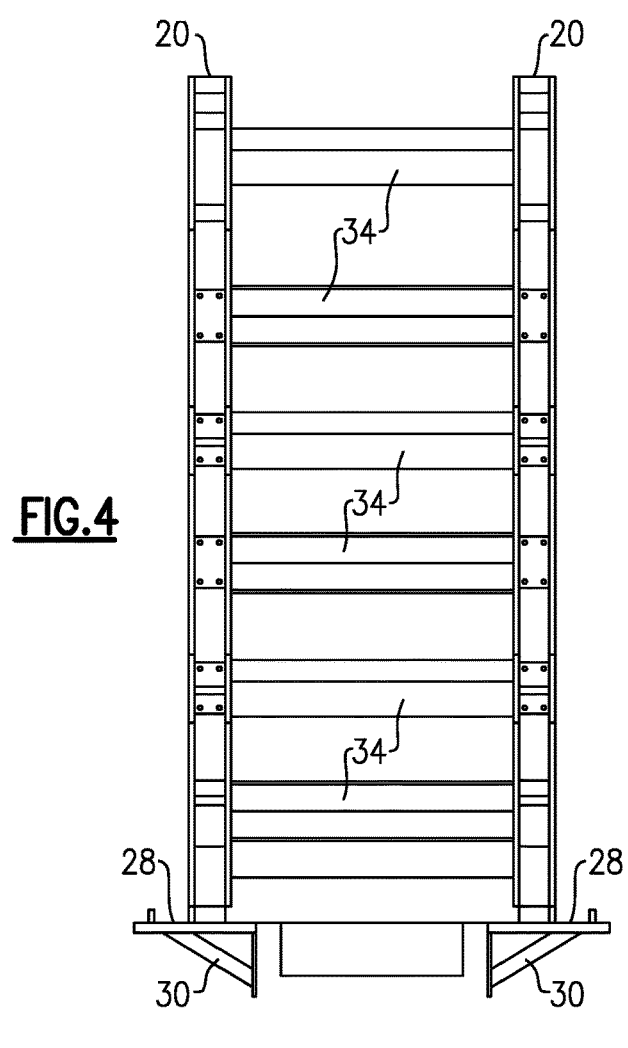
FIG. 4 is a rearward facing side view of the tank mount system of FIG. 2.

This disclosure details an exemplary tank mount system including a center support and resilient retention structure to mount a plurality of tanks to a vehicle.

FIG. 1 shows a tank mount system 10 to support a plurality of tanks 12 on a vehicle 14. In one example, the vehicle 14 includes a passenger compartment or cab that is supported on a chassis 16. The tank mount system 10 includes retention members 18 to support the plurality of tanks 12 on a center support structure 20.

As shown in FIG. 2, the tank mount system 10 includes at least one center support structure 20 having a first side configured to support a first plurality of tanks 12 and a second side configured to support a second plurality of tanks 12. Retention structure members 18 are attachable to each side of the center support structure 20 to resiliently support the first and second pluralities of tanks 12. In one example, the retention structure member 18 comprises one or more clamps 18.

Figures 5, 6:
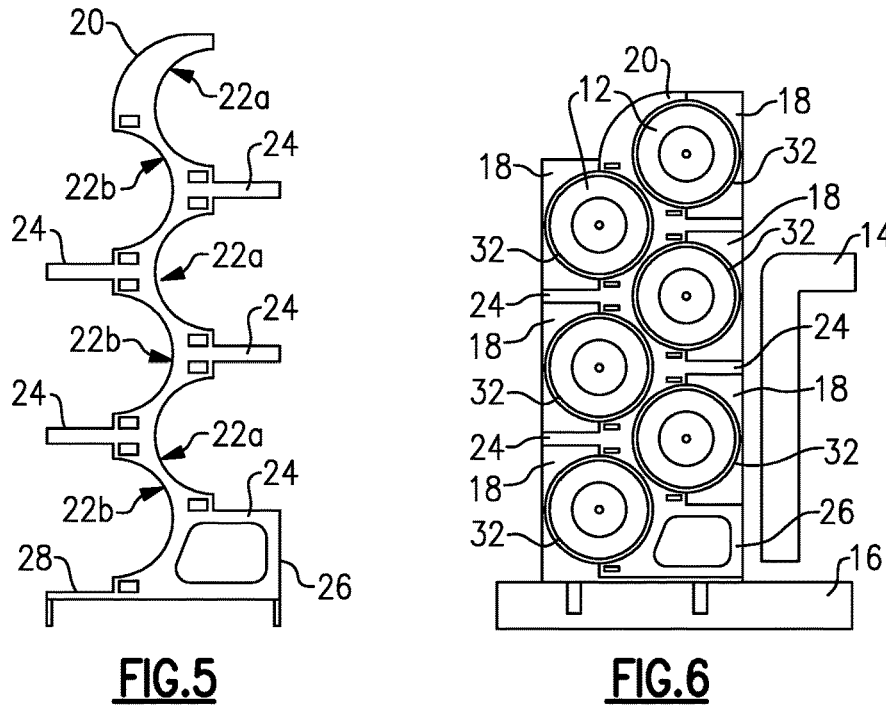
FIG. 5 is similar to FIG. 2 but without the retention bands.
FIG. 6 shows the tank mount system of FIG. 2 holding a plurality of tanks and being mounted to a chassis.

In one example, the first side of the center support structure 20 comprises a first plurality of tank mount recesses 22a for the first plurality of tanks 12 and the second side comprises a second plurality of tank mount recesses 22b for the second plurality of tanks 12. In one example, there is one clamp 18 for each of the first plurality of recesses 22a and the second plurality of recesses 22b (FIG. 6).

In one example, the tanks 12 comprise cylindrical bodies that are mounted to extend in a horizontal or lateral direction such that tank fill ends face one side of the vehicle 14. Other mounting configurations could also be used, e.g. a vertical orientation or a combination of horizontal and vertical orientations.

In one example, the first plurality of tank mount recesses 22a are vertically spaced apart from each other to provide a first column of tanks 12, and the second plurality of tank mount recesses 22b are vertically spaced apart from each other to provide a second column of tanks 12. In one example, the first plurality of tank mount recesses 22a are staggered or offset from the second plurality of tank mount recesses 22b in a vertical direction as shown in FIG. 2. This provides for a compact mounting configuration.

In one example, each of the first and the second plurality of tank mount recesses 22a, 22b comprises an arcuate surface that surrounds one portion of an outer peripheral tank surface, and each clamp 18 includes a clamp arcuate surface 54 (FIG. 10A) that surrounds a remaining portion of the outer peripheral tank surface.

As shown in FIGS. 2-3, the center support structure 20 includes a plurality of ledges 24 on each side of the center support structure 20 to which the clamps 18 are attached to support the tanks 12. A base portion 26 is associated within one of the ledges 24 to accommodate the staggered tank configuration. The base portion 26 is supported on a base plate 28 that is attached to the chassis 16 with a plurality of mounting brackets 30. In the example shown, the first plurality of tank mount recesses 22a start at a vertically higher location than the second plurality of tank mount recesses 22b. The base portion 26 extends from the ledge 24 associated with the lowest tank mounting recess 22a to the base plate 28. In one example, the base portion 26 can include a hollowed out area to reduce weight. Additionally, this open area can serve as a storage volume for other components such as manifolds, controls, valves, etc. for example.

In one example, the tank mount system 10 includes a retention band 32 that is associated with each tank mounting location as shown in FIGS. 2-3 and 10A-E. The retention bands 32 provide a protective surface that positively contacts each tank 12.

In the example shown in FIG. 1, there are two center support structures 20 that each comprise a plurality of tank mount recesses 22a, 22b. One center support structure 20 is configured to support one end portion of a plurality of tanks 12 and the second center support structure 20 is configured to support an opposite end portion of the plurality of tanks 12. The two center support structures 20 are laterally spaced apart from each other in a direction across a width of the vehicle 14. A plurality of clamps 18 are provided such that each clamp 18 is configured to attach to a respective one of the center support structures 20 at each tank mount recess 22a, 22b to resiliently support each tank 12. The center support structures 20 are attached to a common base plate 28. In one example, a plurality of cross stabilizer members 34 extend between the two center support structures 20 as shown in FIG. 4. In one example, each cross stabilizer member 34 extends between aligned ledges 24 of the two center support structures 20 as shown in FIG. 3.

In one example, the center support structures 20, the base plate 28, and the cross stabilizer members 34 are all made from an aluminum material. In one example, the center support structures 20, the base plate 28, and the cross stabilizer members 34 are welded to each other to provide a single piece welded assembly. This assembly is then attached to the chassis 16 using mounting brackets 30 that attach to the base plate 28.

FIG. 5 shows an example of the center support structure 20 without the retention bands 32. FIG. 6 shows the center support structure 20 with the retention bands 32 and associated clamps 18, which are attached to the center support structure 20 such that each tank 12 is surrounded by a retention band 32 to provide the tank mount system 10. In one example, the system 10 is mounted on the chassis 16 directly behind the cab of the vehicle 14. This stacked and nested mounting configuration provides for increased tank density to allow for additional tanks 12 to be mounted as compared to existing configurations.

FIG. 7 shows the dual center support structures 20 as mounted to the base plate 28 and without the retention bands 32 installed. FIG. 8 shows the retention bands 32 and mounting clamps 18 installed to provide a complete tank mount system 10 but without the tanks 12.

FIG. 9 shows an example of the mounting brackets 30. In this example, the mounting brackets 30 comprise an L-shaped member 30a having one leg fixed to the chassis 16 and another leg attached to a bottom surface of the base plate 28. An angled portion 30b extends between the legs to provide an angled bracket configuration. Other types of brackets could also be used.

FIGS. 10A-F show an exemplary embodiment of the clamp 18. Each clamp 18 includes an upper end 40 and a lower end 42. In one example, the clamp 18 comprises a C-shaped body with an arcuate surface 54 extending between the upper 40 and lower 42 ends. The upper end 40 includes a forward mount interface 44 and the lower end 42 includes a forward mount interface 46. A third mount interface 48 (FIGS. 10A and 10F) is provided on an upwardly facing surface of the upper end 40 and a fourth mount interface 50 (FIG. 10E) is provided on a downwardly facing surface of the lower end 42. The clamp 18 includes an outward facing surface 52 that extends between the upper 40 and lower 42 ends. The arcuate surface 54, which forms the C-shape, faces opposite the outward facing surface 52 in a radially inward direction.

Each clamp 18 further includes a resilient member 56 and retention band 32 that cooperates with a corresponding resilient member 56 and retention band 32 associated with each of the first and the second pluralities of tank mount recesses 22a. 22b to resiliently support the tanks 12. These modular clamps 18 are thus spring loaded and ensure that there is a structural load path to maintain constant tank clamp pressure.

In one example, the resilient member 56 and the corresponding resilient member 56 cooperate to provide a spring loaded washer that surrounds each tank 12. In one example, the retention band 32 and the corresponding retention band 32 cooperate to provide a protective ring that surrounds each tank 12. The protective ring is radially outward of the spring loaded washer and covers the spring loaded washer (FIGS. 10C-D) such that the protective ring positively contacts an outer tank surface.

In one example, resilient member 56 comprises a low cost "wave washer" that is covered by the retention band 32, which comprises a composite retention slide to protect the tank skin from the clamp 18. The resilient member 56 maintains a constant pressure between the clamp 18 and the tank 12 to ensure proper retention of the tank 12 on the center support structure 20. In one example, the retention band 32 is comprised of a polymer material.

In one example, each clamp 18 includes resilient members 56 covered by retention members 32 at forward and rearward edges of the clamp 18 (see FIGS. 10A and 10C-D). The forward and rearward edges are spaced apart from each other in a direction along a center axis of the associated tank 12. The associated recesses 22a, 22b also include resilient members 56 covered by retention members 32 at forward and rearward edges of the recesses 22a. 22b (see FIG. 3). As such, at each clamp location, there are two resilient members and retention member assemblies 32/56 that completely surround the tank 12. This provides for a very stable and secure mounting configuration.

In one example, the forward mount interface 44 of the upper end 40 includes apertures 44a that receive fastening elements 58 (FIG. 2) to attach the clamp 18 to the center support structure 20 at a location above an associated tank 12, and the forward mount interface 46 of the lower end 42 includes apertures 46a that receive fastening elements 60 (FIG. 2) to attach the clamp 18 to the center support structure 20 at a location below an associated tank 12. As shown in FIG. 2, the third mount interface 48 (FIGS. 10A and 10F) includes apertures 48a on the upper end 40 that receive fastening elements 62 on a lower facing surface of an associated ledge 24 and the fourth mount interface 50 (FIG. 10E) includes apertures 50a on the lower end 42 that receive fastening elements 64 on an upward facing surface of an associated ledge 24.

In one example, a plurality of windows 70 are provided for wrench accessibility (see FIG. 7).

In one example, the clamp body comprises a cast aluminum structure. The clamp is fastened at top, bottom, and front surfaces to the vertical center support structure 20 in a rigid manner, except for the top tanks which do not have a top mount. In the example shown, there are six tanks 12 and each tank 12 has two clamps 18. This provides twelve radial attachment surfaces. As such, the clamp 18 acts as modular block to accept the load path for adjacent components and retains the tank 12 in place.

The disclosed tank mount system 10 comprises a dual tandem set of vertical tree center members 20 to support tanks 12 via a cast aluminum clamping system. The system 10 provides a serviceable configuration with reduced weight, fewer parts, and lower cost comparted to existing configurations. The use of the retention bands 32 allows the tanks 12 to be easily slid out of the center support structures 20 on an individual manner should replacement be required. Additionally, the tank mount system 10 meets resonant frequency requirements, e.g. 30 Hz for example, and increases range as additional tanks can be mounted within the system as compared to traditional designs. Other advantages of the subject system include the provision of a tank clamping system that is spring loaded to maintain continuous retention resistance on the tanks, and which provides positive contact to allow a load path to the center contact structure. The resilient clamping structure also accommodates any tolerance stack-up issues that may exist. The tank skin is protected from direct clamping pressures via the retention band.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A tank mount system, comprising:
   a center support structure having a first side configured to support a first plurality of tanks and a second side configured to support a second plurality of tanks, wherein the first side comprises a first plurality of tank mount recesses for the first plurality of tanks and the second side comprises a second plurality of tank mount recesses for the second plurality of tanks that are offset from the first plurality of tank mount recesses; and a retention structure attachable to each side of the center support structure to resiliently support each tank of the first and second pluralities of tanks.

2. The tank mount system according to claim 1, wherein the retention structure comprises at least one clamp.

3. The tank mount system according to claim 2, wherein the at least one clamp comprises a clamp for each of the first plurality of tank mount recesses and for each of the second plurality of tank mount recesses.

4. The tank mount system according to claim 3, wherein each of the first and the second plurality of tank mount recesses comprises an arcuate surface that surrounds one portion of an outer peripheral tank surface.

5. The tank mount system according to claim 4, wherein each clamp includes a clamp arcuate surface that surrounds a remaining portion of the outer peripheral tank surface.

6. The tank mount system according to claim 3, wherein each clamp includes at least one resilient member and at least one retention band that cooperates with a corresponding resilient member and retention band associated with each of the first and the second pluralities of tank mount recesses to resiliently support the first and second pluralities of tanks.

7. The tank mount system according to claim 6, wherein the resilient member and the corresponding resilient member cooperate to provide a spring loaded washer that surrounds each tank.

8. The tank mount system according to claim 7, wherein the retention band and the corresponding retention band cooperate to provide a protective ring that surrounds each tank.

9. The tank mount system according to claim 8, wherein the protective ring is radially outward of the spring loaded washer and covers the spring loaded washer such that the protective ring positively contacts an outer tank surface.

10. The tank mount system according to claim 1, wherein the retention structure comprises a plurality of clamps are separate from each other such that one clamp is individually securable to an associated tank mount recess of each of the first and the second plurality of tank mount recesses.

11. The tank mount system according to claim 1, including a spring loaded washer that surrounds each tank of the first and second pluralities of tanks.

12. A tank mount system, comprising:

a first center support structure having opposing first and second sides that each comprise a plurality of tank mount recesses;

a second center support structure having opposing first and second sides that each comprise a plurality of tank mount recesses, wherein the first center support structure is configured to support one end portion of a plurality of tanks and the second center support structure is configured to support an opposite end portion of the plurality of tanks; and a plurality of clamps, wherein each clamp is configured to attach to a respective one of the first and the second center support structures at each tank mount recess to resiliently support each tank, and wherein each clamp includes a forward edge with a forward retention band and a rearward edge with a rearward retention band that is separate from the forward retention band.

13. The tank mount system according to claim 12, wherein each tank mount recess comprises an arcuate surface that surrounds one portion of an outer peripheral tank surface, and wherein each clamp includes a clamp arcuate surface that surrounds a remaining portion of the outer peripheral tank surface.

14. The tank mount system according to claim 12, wherein each clamp includes one separate resilient member associated with each of the forward retention band and rearward retention band, and wherein the separate resilient members cooperate with corresponding resilient members and retention bands associated with each tank mount recess to resiliently support a plurality of tanks.

15. The tank mount system according to claim 12, including a base plate that supports the first and the second center support structures, and wherein the base plate is configured to attach to a vehicle chassis with a plurality of brackets.

16. The tank mount system according to claim 12, wherein the plurality of clamps are separate from each other such that each clamp is individually securable to an associated tank mount recess of each of the plurality of tank mount recesses.

17. The tank mount system according to claim 12, including a spring loaded washer that surrounds each tank.

18. A method comprising:

providing a center support structure having a first side configured to support a first plurality of tanks and a second side configured to support a second plurality of tanks, wherein the first side comprises a first plurality of tank mount recesses for the first plurality of tanks and the second side comprises a second plurality of tank mount recesses for the second plurality of tanks;

staggering the second plurality of tank mount recesses from the first plurality of tank mount recesses in a direction along a height of the center support structure; and resiliently clamping the first plurality of tanks to the first side with a first retention structure and resiliently clamping the second plurality of tanks to the second side with a second retention structure such that each tank is resiliently supported.

19. The method according to claim 18, including providing a clamp for each of the first and second pluralities of tank mount recesses that is attached to respective first and second sides of the center support structure, wherein each clamp includes at least one resilient member and at least one retention band that cooperates with a corresponding resilient member and retention band associated with each of the first and second pluralities of tank mount recesses to resiliently support the first and second pluralities of tanks.

20. The method according to claim 18, including:

providing a plurality of discrete clamps that are separate from each other; and individually securing each clamp to one tank mount recess of each of the first and second pluralities of tank mount recesses.

* * * * *